United States Patent [19]
Kanekal

[11] Patent Number: 5,923,858
[45] Date of Patent: Jul. 13, 1999

[54] METHOD AND APPARATUS TO INTERFACE A PERIPHERAL DEVICE OPERATING IN AN INTERNAL CLOCK DOMAIN TO A PCI BUS OPERATING IN A PCI CLOCK DOMAIN

[75] Inventor: Hemanth G. Kanekal, San Jose, Calif.

[73] Assignee: Cirrus Logic, Inc., Fremont, Calif.

[21] Appl. No.: 08/850,121

[22] Filed: May 1, 1997

[51] Int. Cl.⁶ .................................................. G06F 13/14
[52] U.S. Cl. ........................... 395/287; 395/309; 395/878
[58] Field of Search .................................. 395/280–310, 395/878, 726–732, 822–841

[56] References Cited

U.S. PATENT DOCUMENTS

| | | | |
|---|---|---|---|
| 5,434,996 | 7/1995 | Bell | 395/551 |
| 5,613,075 | 3/1997 | Wade et al. | 395/287 |
| 5,692,137 | 11/1997 | Regal et al. | 395/309 |
| 5,696,949 | 12/1997 | Young | 395/551 |
| 5,721,882 | 2/1998 | Singh | 395/500 |
| 5,737,545 | 4/1998 | Wszolek et al. | 395/288 |
| 5,761,462 | 6/1998 | Neal et al. | 395/309 |
| 5,771,359 | 6/1998 | Galloway et al. | 395/308 |

OTHER PUBLICATIONS

"Accelerated Graphics Port Tutorial," an internet based tutorial at http://developer.intel.com/technology/agp/tutorial/index.htm, Intel Corporation, 1998.

*Primary Examiner*—Thomas C. Lee
*Assistant Examiner*—Harold J. Kim
*Attorney, Agent, or Firm*—Frank D. Nguyen

[57] ABSTRACT

The present invention is implemented in a peripheral component coupled to a peripheral component interconnect (PCI) bus. The peripheral component includes an internal device operating in an internal clock domain while the PCI bus operates in a PCI clock domain. The system of the present invention efficiently interfaces the internal device with the PCI bus. The present invention generates and couples a request for PCI bus ownership, originating from the internal device, to the PCI bus. The present invention then determines whether the PCI bus is idle or busy. Where the PCI bus is idle, a proceed signal is generated for the internal device. Where the PCI bus is busy, a do not proceed signal for the internal device is generated. Both the proceed and the do not proceed signals are synchronous to the internal clock domain. The PCI bus is acquired and a data transaction from the internal device is executed when the internal device receives the proceed signal. The data transaction is translated from the internal clock domain to the PCI clock domain. The data transaction is postponed when the internal device receives the do not proceed signal. The present invention causes a retry for an external data transaction directed at the internal device to prevent the external data transaction from conflicting with the data transaction from the internal device. In so doing, the system of the present invention ensures the internal device is properly and efficiently interfaced to the PCI bus regardless of the differing clock domains.

21 Claims, 13 Drawing Sheets

METHOD AND APPARATUS TO INTERFACE A PERIPHERAL DEVICE OPERATING IN AN INTERNAL CLOCK DOMAIN TO A PCI BUS OPERATING IN A PCI CLOCK DOMAIN

FIELD OF THE INVENTION

The present invention pertains to the field of computer system bus architectures. More particularly, the present invention relates to a method and system for peripheral component interconnect (PCI) bus acquisition by a device in a differing time domain.

BACKGROUND OF THE INVENTION

A bus architecture of a computer system conveys much of the information and signals involved in the computer system's operation. One or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. In typical hardware applications, such as, graphics adapters, full motion video adapters, small computer systems interface (SCSI) host bus adapters, and the like, it is imperative that large block data transfers be accomplished expeditiously. These applications are just some examples of subsystems which benefit substantially from a fast bus transfer rate. In many computer system architectures of today, the majority of the above mentioned subsystems reside on the computer system's expansion bus.

The expansion bus is generally used as a method of adding functional components to the computer system. Devices are physically coupled to the expansion bus and use the expansion bus to communicate and exchange information. The peripheral component interconnect (PCI) bus comprises an industry standardized expansion bus architecture upon which many "peripheral" devices are manufactured. As such, the PCI bus has become a widely known and widely supported expansion bus architecture.

Prior art FIG. 1 shows a typical prior art PCI bus architecture 100. PCI bus architecture 100 is comprised of a CPU 102 and a main memory 104, coupled to a host PCI bridge/arbiter 106 through a CPU local bus 108 and memory bus 110, respectively. A PCI bus 112 is coupled to each of PCI agents 114, 116, 118, 120, 122, 124. PCI bus 112 is also coupled to host PCI bridge/arbiter 106.

Referring still to prior art FIG. 1, each of PCI agents 114, 116, 118, 120, 122, 124 (hereafter, PCI agents 114-124) use PCI bus 112 to transmit and receive data. PCI bus 112 is comprised of functional signal lines, e.g., interface control lines, address/data lines, error signal lines, and the like. Each of PCI agents 114–124 are coupled to the functional signal lines. To expedite the flow of data and information, PCI bus architecture 100 supports "bus mastering". Bus mastering is the generally accepted term referring to one of the PCI agents 114–124 acquiring ownership of PCI bus 112 in order to stream line the data transfer process (e.g., to accomplish burst transfers). When one of PCI agents 114–124 requires the use of PCI bus 112 to transmit data, it requests PCI bus ownership from host PCI bridge/arbiter 106. Each of PCI agents 114–124 may independently request PCI bus ownership. Thus, at any given time, several of PCI agents 114–124 may be requesting PCI bus ownership simultaneously. Where there are simultaneous requests for PCI bus ownership, host PCI bridge/arbiter 106 arbitrates between requesting PCI agents to determine which requesting PCI agent is granted PCI bus ownership. When one of PCI agents 114–124 is granted PCI bus ownership, it initiates a transaction (e.g., data transfer) with a "target device" or destination device (e.g., main memory 104). The PCI agent granted PCI bus ownership is referred to as the "initiator device" or simply, the initiator. The protocols used in the process of acquiring, using, releasing, and configuring PCI bus 112 and PCI agents 114–124 are governed through well known and widely supported industry standards (e.g., the PCI Local Bus Specification, Revision 2.10, referred to hereafter as the PCI specification).

Bus transactions on PCI bus 112, in accordance with the PCI bus specification, are synchronous transactions. Synchronous refers to the fact that information flows from one of PCI agents 114–124 to another synchronous to the PCI bus clock. In accordance with the PCI specification, logical information (e.g., addresses, data, commands, byte enables, and the like) is evaluated with respect to the PCI bus clock. Accordingly, each initiator device and each target device operates synchronously with respect to the PCI bus clock. Arbitration for bus ownership, data transfer signals, addresses, and the like, are considered valid on the rising edge of the PCI bus clock.

There is a problem, however, in that only host PCI bridge/arbiter 106 has access to all requests from PCI agents 114–124. Each of agents 114–124 supports a dedicated request-grant signal pair coupled directly to host PCI bridge/arbiter 106. The request-grant signal pairs are used by host PCI bridge/arbiter 106 to arbitrate bus ownership as described above. No one of agents 114–124 has access to the request-grant signal pair of any other of agents 114–124. Because of this, no one of agents 114–124 can determine in advance if PCI bus 112 may be accessed without conflict.

There is another problem in that no one agent has access to any other agent's request-grant signal pairs. Where one agent may be commencing a data transfer, that agent could possibly be the target of a simultaneous data transfer, resulting in a "collision". Consequently, each of agents 114–124 is required to have built in collision detection and recovery logic, increasing their respective costs. Additionally, these collisions and possible "deadlocks" reduce the data transfer bandwidth of the of PCI bus 112.

Yet another problem is that since all logical information on PCI bus 112 is synchronous to the PCI bus clock, accesses by an agent operating in a differing clock domain can potentially render PCI bus architecture 100 unstable. An agent operating in a different clock domain functions in an essentially asynchronous manner. Its internal operations are orchestrated with respect to its own internal clock as opposed to the PCI bus clock. Where the internal clock and the PCI bus clock operate at different frequencies, the timing requirements for bus arbitration may be violated. Potentially, such violations could render PCI bus architecture 100 totally unusable.

Thus, what is required is a system which interfaces an agent operating in one clock domain to a PCI bus operating in another clock domain. What is required is a system which avoids collisions between agents. The required solution should avoid causing deadlocks, thereby and enhancing the data transfer bandwidth of the PCI bus. What is further required is a system which can determine in advance whether the PCI bus may be accessed without causing a conflict.

SUMMARY OF THE INVENTION

The present invention comprises a system for efficiently interfacing an agent operating in one clock domain to a PCI bus operating in another clock domain. The system of the present invention interfaces agents from differing clock domains while avoiding collisions between differing initiating agents and without causing deadlocks. The system of the present invention determines in advance whether the PCI bus may be accessed without causing a conflict. In so doing, the system of the present invention enhances the effective data transfer bandwidth of the PCI bus.

The present invention is implemented in an PCI agent coupled to a PCI bus. The agent includes an internal device operating in an internal clock domain while the PCI bus operates in a PCI clock domain. The system of the present invention efficiently interfaces the internal device with the PCI bus. The present invention generates and couples a request for PCI bus ownership, originating from the internal device, to the PCI bus. The present invention then determines whether the PCI bus is idle or busy. Where the PCI bus is idle, a proceed signal is generated for the internal device. Where the PCI bus is busy, a do not proceed signal for the internal device is generated. Both the proceed and the do not proceed signals are synchronous to the internal clock domain. The PCI bus is acquired and a data transaction from the internal device is executed when the internal device receives the proceed signal. The data transaction is translated from the internal clock domain to the PCI clock domain. The data transaction is postponed when the internal device receives the do not proceed signal. The present invention causes a retry for an external data transaction directed at the internal device to prevent the external data transaction from conflicting with the data transaction from the internal device. In so doing, the system of the present invention ensures the internal device is properly and efficiently interfaced to the PCI bus regardless of the differing clock domains.

BRIEF DESCRIPTION OF THE DRAWINGS

The present invention is illustrated by way of example and not by way of limitation, in the figures of the accompanying drawings and in which like reference numerals refer to similar elements and in which.

Prior Art

DETAILED DESCRIPTION OF THE INVENTION

In the following detailed description of the present invention, a method and system for interfacing a PCI device operating in one clock domain to an external PCI bus operating in a differing clock domain, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "transferring" or "translating" or "outputting" or "receiving" or "executing" or the like, refer to the action and processes of a computer system (e.g., bus architecture 200 of FIG. 2), or similar electronic computing device, that manipulates and transforms data represented as physical (electronic) quantities within the registers and memories of bus architecture into other data similarly represented as physical quantities within the bus architecture memories or registers or other such information storage, transmission or display devices.

Figure 1:
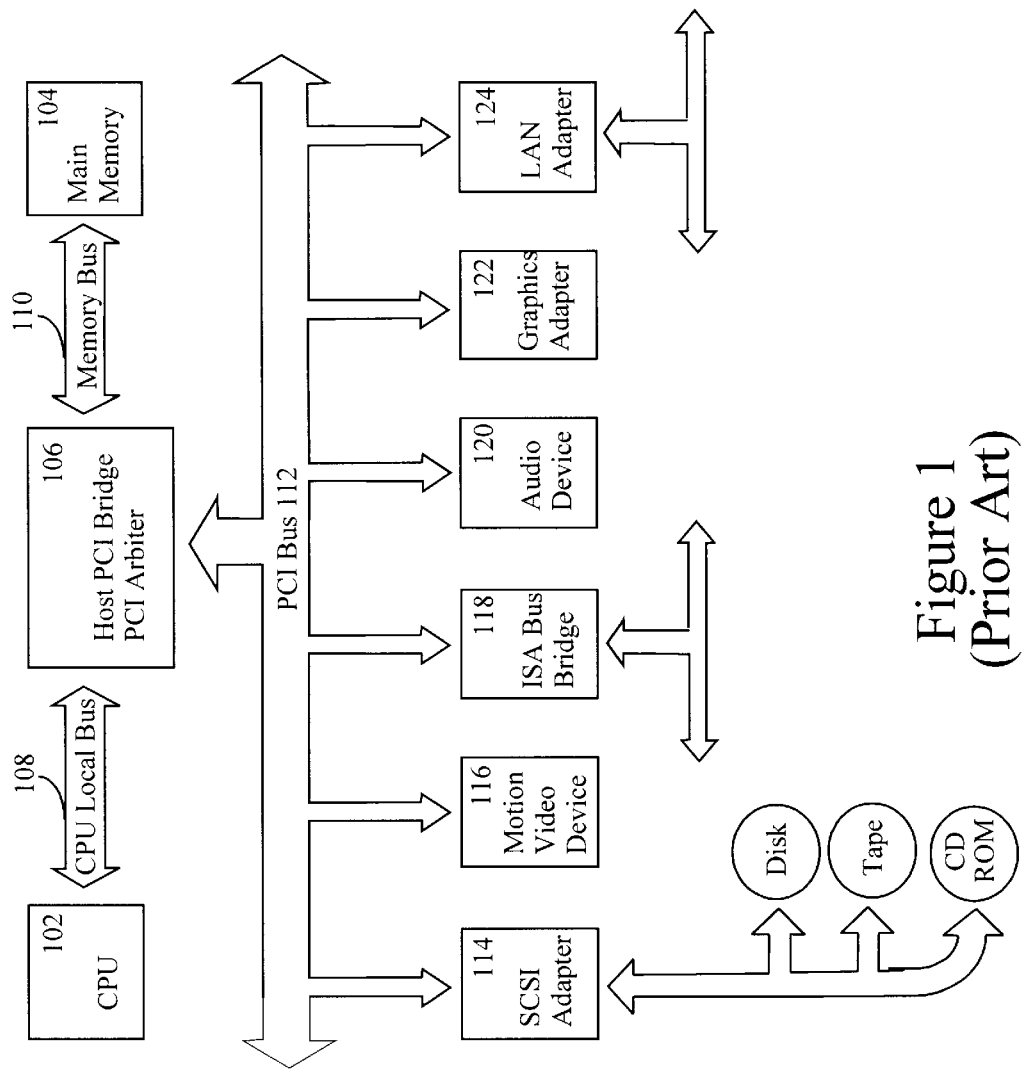
FIG. 1 shows a typical prior art PCI bus architecture.
Figure 2:
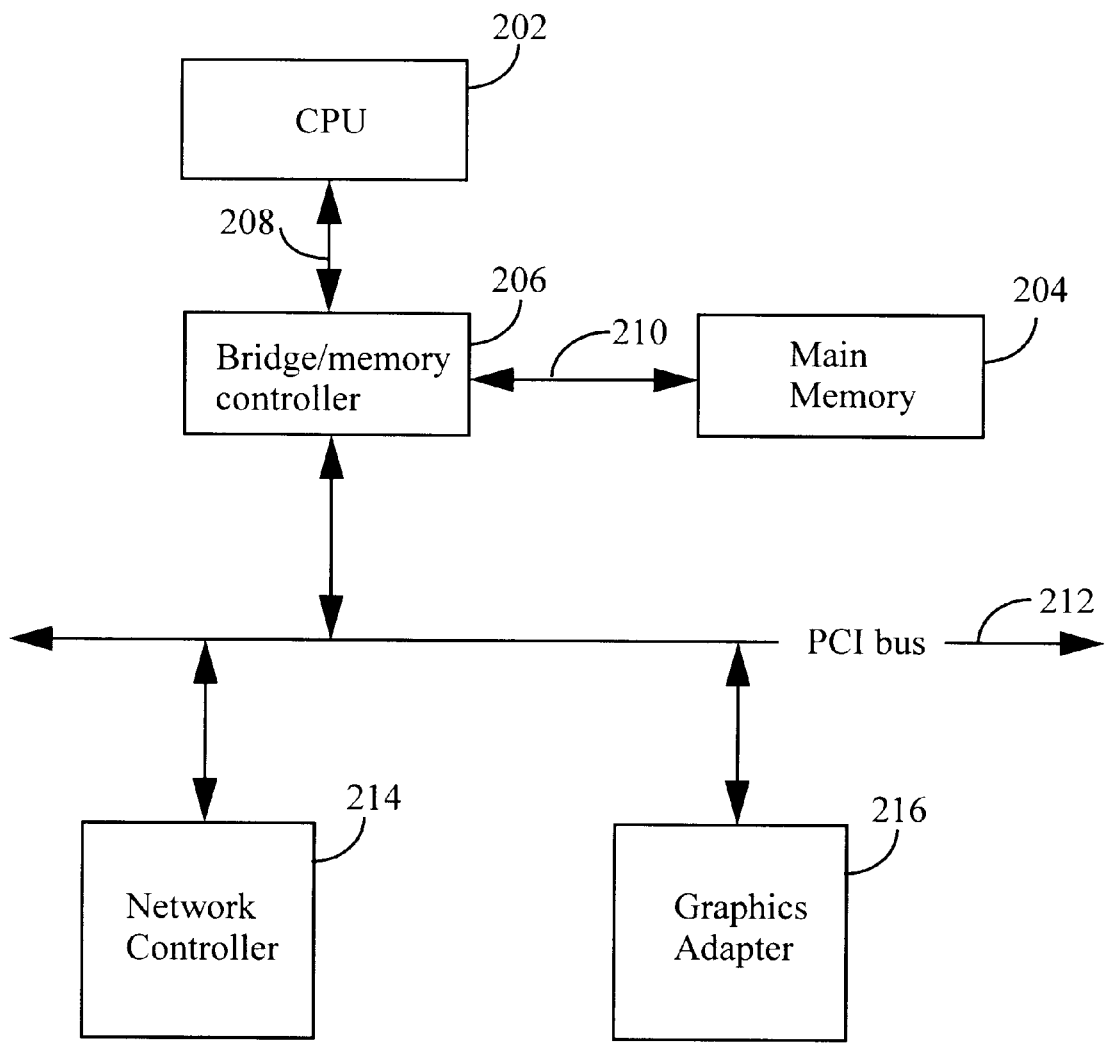
FIG. 2 shows a PCI bus architecture in accordance with one embodiment of the present invention.

Referring now to FIG. 2, a bus architecture 200 in accordance with one embodiment of the present invention is shown. Bus architecture 200 comprises a PCI bus architecture (hereafter PCI bus architecture 200) in which the present invention functions. PCI bus architecture 200 includes a CPU 202 and a main memory 204, coupled to a host PCI bridge/memory controller 206 through a CPU local bus 208 and memory bus 210, respectively. A PCI bus 212 is coupled to each PCI agent within PCI bus architecture 200. Two such PCI agents, a network controller 214 and a graphics adapter 216, are shown. Bridge/memory controller 206 contains an arbiter for arbitrating ownership of PCI bus 212. PCI agents 214 and 216 use PCI bus 212 to transmit and receive data. Additionally, bridge/memory controller 206 uses PCI bus 212 to transmit and receive data to PCI agents 214 and 216, or any other PCI agent coupled to PCI bus 212. Both CPU 202 and main memory 204 transfer data to and from PCI bus 212 via bridge/memory controller 206.

To expedite the flow of data and information, PCI bus architecture 200 supports bus mastering. Bus mastering refers to the fact that either agent 214, agent 216, or bridge/memory controller 206 can acquire ownership of and use PCI bus 212 to accomplish data transactions. The protocols used in the process of acquiring, using, releasing, and configuring PCI bus 212 and PCI agents 214 and 216 are governed through well known and widely supported industry standards (e.g., the PCI Local Bus Specification, Revision 2.10, referred to hereafter as the PCI bus Specification).

Referring still to FIG. 2, the present invention comprises a system for efficiently interfacing an agent operating in one clock domain to a PCI bus operating in another clock domain. Data transactions occurring synchronously with the PCI clock are referred to as being in the PCI clock domain. In accordance with the PCI specification, the data is considered valid on the rising edge of the PCI clock.

Network controller 214, supports its own internal clock domain (e.g., for service network data packets, relaying frames, and the like). The internal logic and data transfers of network controller 214 are synchronous to its own, much faster, internal clock. By functioning in its own clock domain, the internal devices comprising network controller 214 function at frequencies suited to their individual purposes. For example, in one embodiment of network controller 214, since the frequency of the PCI clock, in accordance with the PCI specification, can vary greatly over its range (e.g., 4 MHz to 33 MHz), the frequency of the internal clock is maintained in a constant optimal state, regardless of the PCI clock. Hence, the internal devices of network controller 214 are optimized to function at a constant, ideal internal clock frequency, most suited to their particular purpose.

Similarly, in the present embodiment of network controller 214, the frequency of the internal clock is maintained at a much higher frequency than the frequency of PCI bus 212. Consequently, the performance of network controller 214 is much greater than a typical prior art network controller, which is limited to PCI bus frequencies (e.g., typically 33 MHz). However, regardless of the magnitude of the differing internal clock frequencies of the various embodiments of network controller 214, with each embodiment, data transactions across PCI bus 212 need to be in the PCI clock domain, synchronous to the PCI clock.

Thus, the present network controller 214 includes a system in accordance with the present invention. The present invention ensures that, even though the internal clock domain of network adapter 214 differs from the PCI clock domain of PCI bus 212, network adapter 214 is properly interfaced with PCI bus 212. Additionally, the system of the present invention determines in advance whether PCI bus 212 can be accessed by network controller 214 without causing a conflict. In so doing, the system of the present invention enhances the data transfer bandwidth of the PCI bus 212 and network controller 214. The present invention and its benefits are described in greater detail below.

Figure 3:
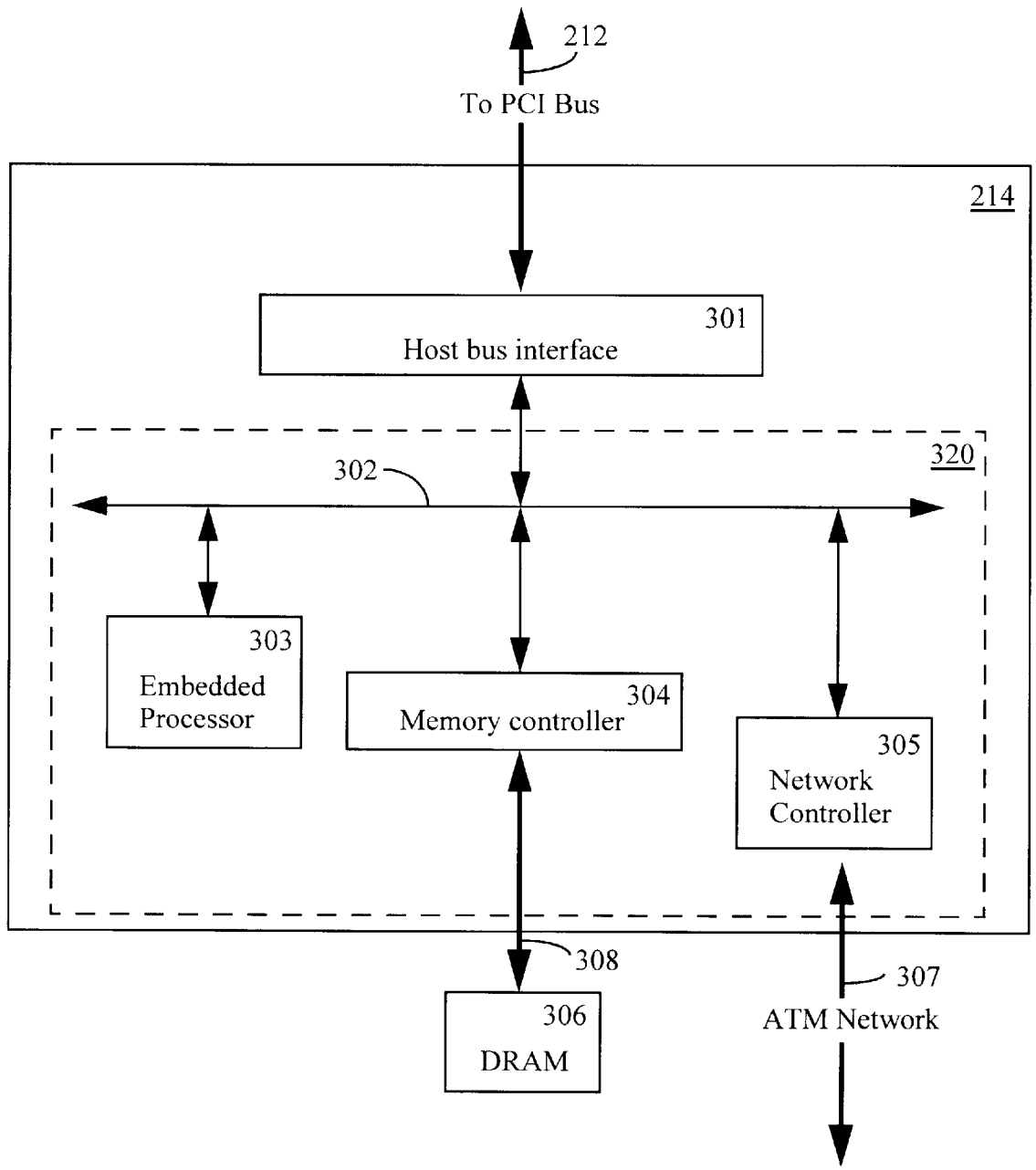
FIG. 3 shows a block diagram of a network adapter in accordance with one embodiment of the present invention.

With reference now to FIG. 3, a block diagram of network adapter 214 in accordance with one embodiment of the present invention is shown. Network adapter 214 is coupled to PCI bus 212 via a host bus interface 301. Host bus interface 301, an embedded processor 303, a memory controller 304, and a network controller 305 are each respectively coupled via an internal bus 302. Memory controller 304 is coupled to a DRAM (dynamic random access memory) 306 and internal network controller 307 couples to an ATM (asynchronous transfer mode) network 307. DRAM 306 is coupled to memory controller 304 via bus 308.

Network controller 214 functions by transferring data to and from PCI bus 212 to and from ATM network 307. Network controller 214 functions in accordance with well known and widely supported ATM network protocols. When receiving data from ATM network 307, data packets from ATM network 307 are temporarily stored into buffers in DRAM 306 via network controller 305, internal bus 302, and memory controller 304. As the buffers of DRAM 306 are filled, the data is transmitted to PCI bus 212 via memory controller 304 internal bus 302, and host bus interface 301. Embedded processor 303 communicates with and orchestrates the operation of memory controller 304 and internal network controller 305. When outputting data across ATM network 307, data from PCI bus 212 is temporarily stored into the buffers of DRAM 306. The data is subsequently "packetized" and transmitted to internal network controller 305, where it is then output via ATM network 307.

Internal bus 302, embedded processor 303, memory controller 304, and network controller 305, comprise an internal device 320 (e.g., an ATM network interface adapter). The internal device 320 operates in its own internal clock domain, synchronously with its own internal clock. In the present embodiment of network controller 214, the internal clock is at a much higher frequency than the PCI clock. Hence, internal device 320 functions much faster than equivalent devices in the PCI clock domain. The host bus interface 301 of the present invention functions by properly interfacing internal device 320 to PCI bus 212.

Host bus interface 301 accommodates the differing clock domains of the signals from internal device 320 and PCI bus 212. When network controller 214 (and hence, internal device 320) is a target of a data transaction initiated by an external PCI agent (e.g., bridge/memory controller 206), host bus interface 301 allows internal device 320 to function as if it were any other conventional PCI agent. For example, when network controller 214, and hence, internal device 320, is a target of a data transaction from bridge/memory controller 206, host bus interface 301 translates the signals of PCI bus 212 from the PCI clock domain to the internal clock domain. Such signals include the request signal REQ#, the address/data signals AD[31:0], the frame signal FRAME#, and the like (e.g., standard PCI bus signals).

Similarly, host bus interface 301 allows the internal device to "acquire" the PCI bus as if it were a bus master. In so doing, host bus host bus interface 301 allows internal device 320 to function as a bus master (e.g., initiator) as well as a target. When internal device 320 has acquired PCI bus 212, it can target any agent coupled to PCI bus 212 for data transactions. These transactions include data reads and data writes. For example, when internal device 320 targets graphics adapter 216 for a display buffer update, the appropriate signals of internal device 320 are translated into the appropriate corresponding PCI signals for PCI bus 212 via host bus interface 301. PCI bus 212 is acquired, graphics adapter 204 is targeted (e.g., addressed as the targeted PCI agent), and the data transaction executed. In so doing, host bus interface 301 implements the protocols of PCI bus 212, conforms to the PCI clock domain in compliance with the PCI specification, and executes the data transaction on behalf of internal device 320, while allowing internal device 320 to continue functioning within its own, higher frequency, internal clock domain.

It should be appreciated that even though the system of the present invention is described embodying network controller 214, the present invention can be readily adapted to embody different PCI agents having different functions. For example, the system of the present invention can be utilized to implement a graphics input device operating at a different internal clock frequency with respect to the PCI clock. As such, a PCI agent including the system of the present invention can be built for different specific functions without departing the scope of the present invention.

Furthermore, it should be appreciated that even though the host bus interface 301 is shown with a single internal device (e.g., internal device 320), the system of the present invention is readily adapted to accommodate multiple internal devices, each internal device functioning within its own respective clock domain. For example, the system of the present invention could include a communications modem and an ethernet interface adapter in addition to an ATM network interface adapter. As such, multiple internal devices can be coupled to host bus interface 301 without departing the scope of the present invention.

Figure 4:
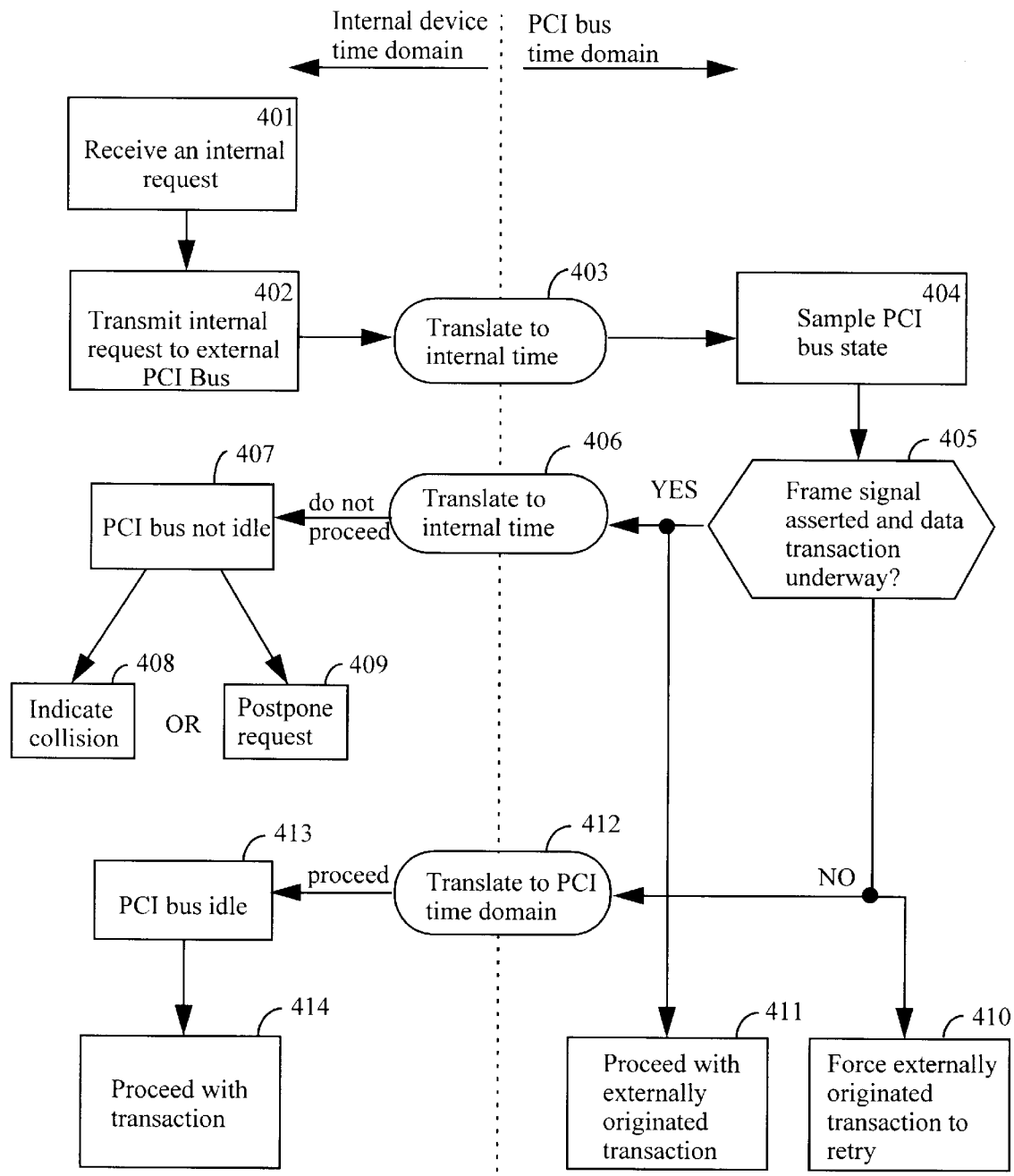
FIG. 4 shows a flow chart of a process in accordance with one embodiment of the present invention.

With reference now to FIG. 4, a flow chart of a process 400 in accordance with one embodiment of the present invention is shown. Process 400 is implemented in the logic circuits of host bus interface 301 and, in accordance with the present embodiment, shows the process utilized by the present invention to interface internal device 320 with PCI bus 212. Process 400 shows an internal device clock domain (e.g., internal device 320) and a PCI bus clock domain (e.g., PCI bus 212) separated by a dotted line. The process steps to the left of the dotted line are implemented in circuitry operating in the internal device clock domain and the process steps to the right are implemented in circuitry operating in the PCI bus clock domain. In accordance with the present embodiment, process 400 interfaces internal device 320 operating in its own clock domain with PCI bus 212 operating in its respective clock domain.

In step 401, the process of the present invention receives an internal request for ownership of PCI bus 212. The internal request is received by host bus interface 301 from the internal device 320, which requires use of PCI bus 212 to execute a data transfer (e.g., transfer data received via ATM network 307 to the display buffer of graphics adapter 216). The internal request is synchronous to the internal device clock.

In step 402, internal request is transmitted to the external PCI bus 212 as an internal request signal. This internal request signal however, is in the internal device clock domain. In step 403, the internal request signal is translated into a sample PCI bus state signal, which initiates the sampling of the PCI bus 212 state. The sample PCI bus state signal is in the PCI clock domain. Hence, in step 404, the present invention samples the state of PCI bus 212. In step 405 the system of the present invention determines, via the sampling, whether PCI bus 212 is busy. The PCI signal FRAME# is sampled to determine whether it is asserted. If in the current PCI clock cycle, FRAME# is sampled asserted, PCI bus 212 is assumed busy. If FRAME# is sample deasserted, PCI bus 212 is assumed idle.

When FRAME# is sampled asserted in step 405, an external do not proceed signal in the PCI clock domain is generated. The external do not proceed signal is translated to a do not proceed signal in the internal device clock domain in step 406. In step 407, the do not proceed signal causes the system of the present invention to elect between two options. In one option, in step 408, the system of the present invention will indicate a collision with PCI bus 212. In the other option, in step 409, the data transaction for internal device 320 is postponed, allowing the internal device to continue its own processing and wait to reattempt the data transaction at a later time. The particular option chosen (e.g., step 408 or step 409) depends upon the state and the particular requirements of internal device 320 at a given time. For example, when a resource access conflict occurs, process 400 proceeds to step 408. Otherwise, process 400 proceeds to step 409.

Additionally, when process 400 proceeds to step 409, process 400 also proceeds to step 411. In step 411, the present invention proceeds with the externally originated transaction. The externally originated transaction is executed. In the case where the externally originated transaction is targeted at network controller 214 (i.e., internal device 320), the internal device 320 is configured accordingly and the data is translated from the PCI bus clock domain into the internal device clock domain.

In step 405, when FRAME# is sampled deasserted, an external proceed signal in the PCI clock domain is generated. The external proceed signal is translated to a proceed signal in the internal device clock domain in step 412. The proceed signal is in the internal device clock domain. In step 413, the proceed signal causes the system of the present invention to assume PCI bus 212 is idle.

Subsequently, process 400 progresses to step 414. In step 414, the system of the present invention proceeds with the data transaction for internal device 320. The signals comprising the data transaction are appropriately translated from the internal device clock domain to the PCI bus clock domain. In this manner, the present invention determines in advance whether PCI bus 212 can be accessed without causing conflicts. When the internal device receives the proceed signal, its data transaction can proceed without causing a conflict.

Additionally, when process 400 proceeds to step 414, process 400 also proceeds to step 410. In step 410, the present invention forces subsequent externally originated transactions to "retry". Externally originated transactions occurring after the current PCI clock cycle (i.e., the PCI clock cycle after FRAME# is sampled deasserted in step 405) must wait for the bus to subsequently become idle. In the case where the externally originated transaction is from bridge/memory controller 206 and the transaction is targeted at internal device 320, the transaction is forced to retry. Bridge/memory controller 206 subsequently retries the transaction at a later time. In this manner, external data transactions directed at internal device 320 are forced to retry in order to prevent the external data transaction from interfering with the data transaction from the internal device. In so doing, the system of the present invention reduces the number of collisions occurring, and thus, enhances the effective data transfer bandwidth of PCI bus 212.

Figure 5A:
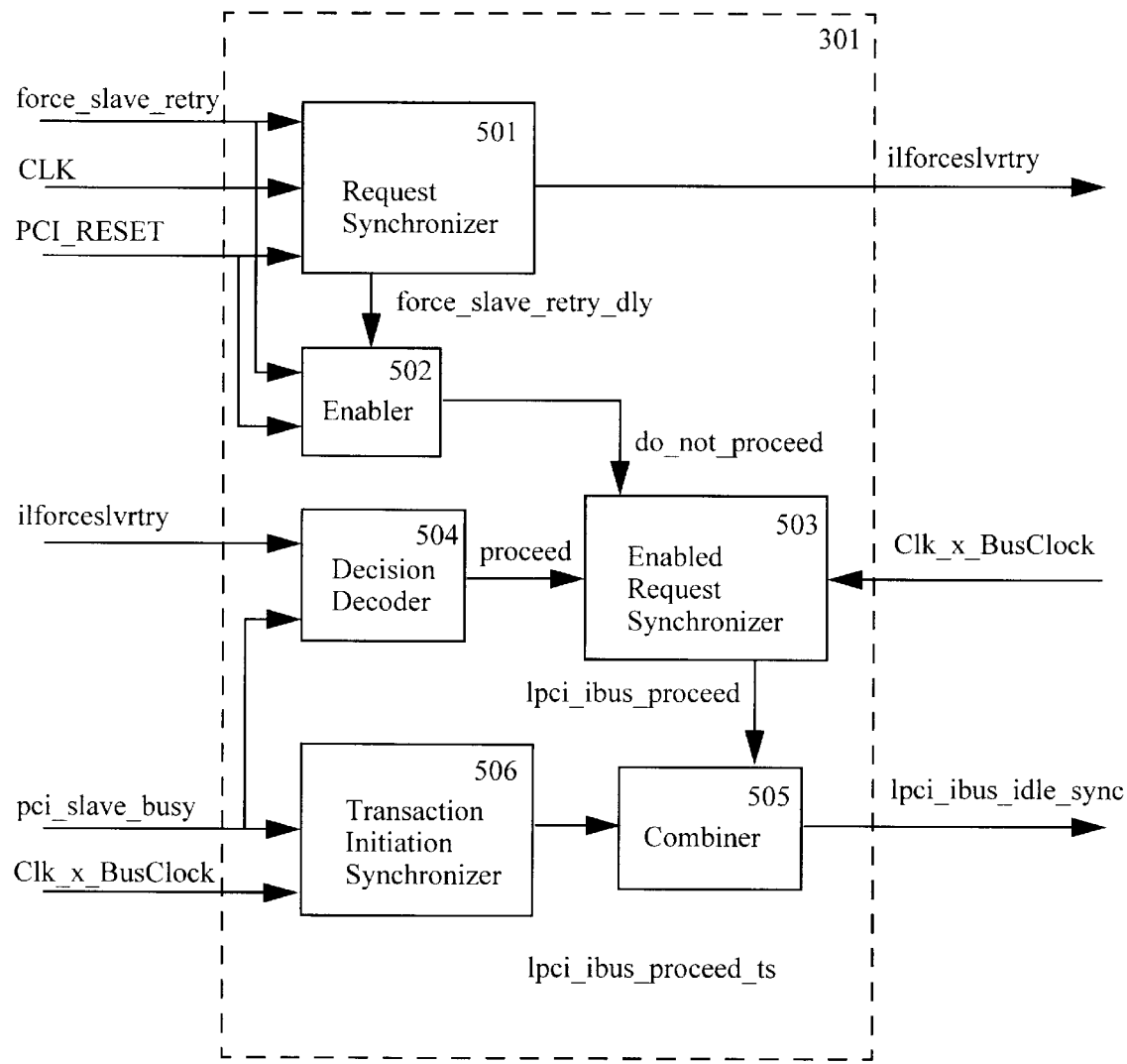
FIG. 5A shows a block diagram of a host bus interface in accordance with one embodiment of the present invention.

FIG. 5A shows a block diagram 500 of a host bus interface 301 in accordance with one embodiment of the present invention. Host bus interface 301 includes logic circuits which implement process 400 of FIG. 4. Host bus interface 301 includes a request synchronizer 501, an enabler 502, an enabled request synchronizer 503, a decision decoder 504, a combiner 505, and a transaction initiation synchronizer 506 (hereafter logic circuits 501–506). Logic circuits 501–506 actualize the internal signals for internal device 320 and the PCI bus signals for PCI bus 212. Diagram 500 shows the PCI bus signals CLK (PCI bus clock signal) and PCI_RESET (PCI bus reset signal). The signals force_slave_retry, force_slave_retry_dly, ilforceslvrty, do_not_proceed, proceed, Clk_x_BusClock, lpci_ibus_proceed, pci_slave_busy, lpci_ibus_proceed_ts, and lpci_ibus_idle sync, are internal device 320 and host bus interface 301 signals. Particularly, CLK is the PCI bus clock signal and is used by host bus interface 301 to synchronize signals transmitted to PCI bus 212 from FIG. 3. Clk_x_BusClock is the internal device clock signal and is used by host bus interface 301 to synchronize signals transmitted to internal device 320 from PCI bus 212. The proceed signal is utilized by host bus interface 301 to signal internal device 320 to proceed with its data transaction, while the do_not_proceed signal is used to signal internal device 320 not to proceed with the data transaction, as described above.

It should be appreciated that diagram 500 shows several specific details of the host bus interface 301 of the present embodiment for the purposes of illustration and in order to provide a more thorough understanding of the present host bus interface 301. However, it will be obvious to those skilled in the art that these specific details can be modified to implement process 400 in differing manners while remaining within the scope of the present invention. Additionally, it should be appreciated that in other instances, well known components and circuits are not shown in diagram 400 as not to unnecessarily obscure aspects of the present host bus interface 301. The signals of host bus interface 301 are further described below.

Figure 5B:
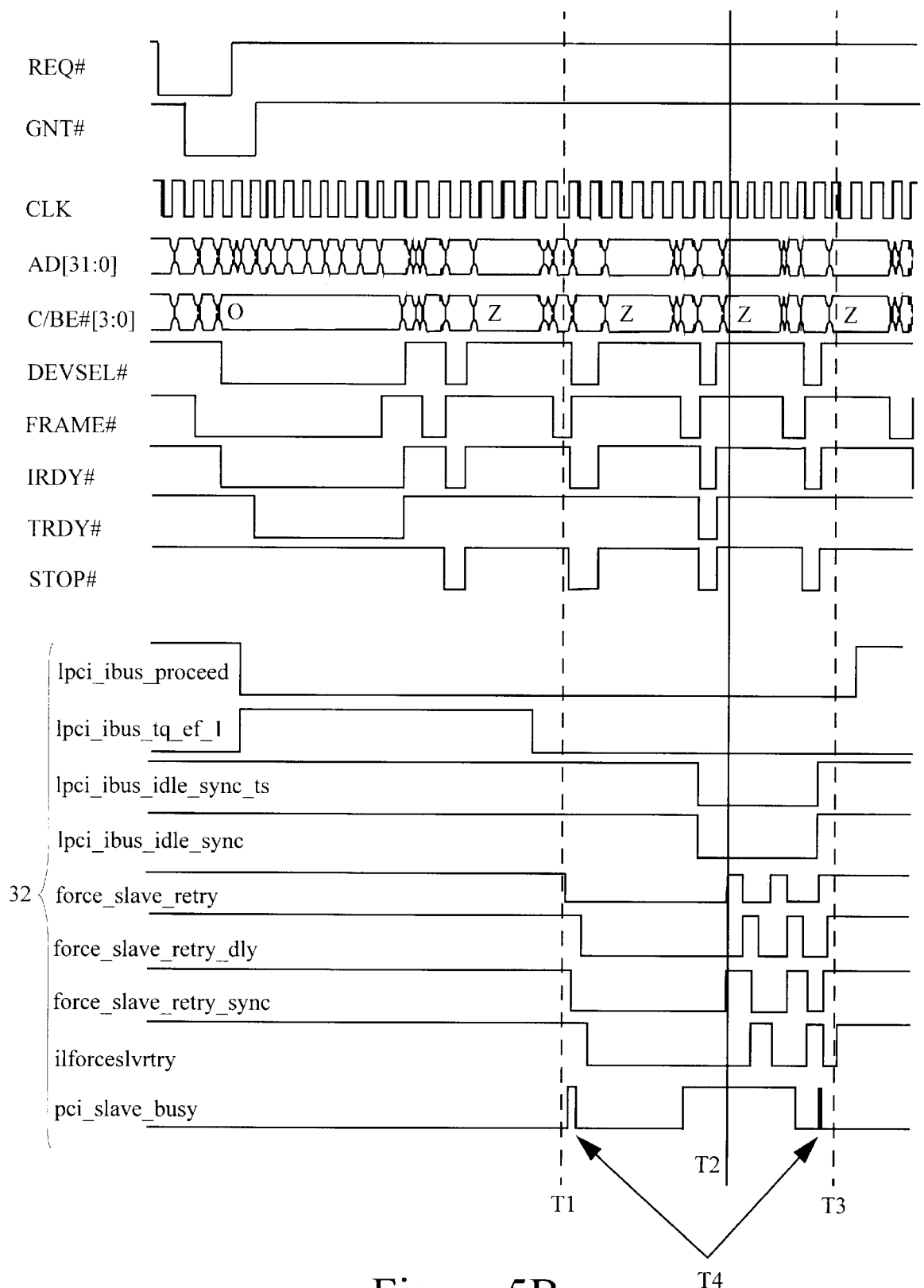
FIG. 5B shows a timing diagram illustrating the operation of the host bus interface from FIG. 5A.

FIG. 5B shows a timing diagram 550 illustrating the operation of host bus interface 301. The signals REQ#, GNT#, CLK, AD[31:0], C/BE#[3:0], DEVSEL#, FRAME#, IRDY#, TRDY#, and STOP# are standard PCI bus signals of PCI bus 212. Signals 552 are the signals of the host bus interface 301 and the internal device 320, as described above.

The signal lpci_bus_proceed is generated by the enabled request synchronizer and indicates whether the PCI bus is busy. The state of FRAME# is one of the factors controlling the assertion of lpci_bus_proceed. The signal lpci_ibus_tq_ef_1 is a signal which indicates whether data being received from PCI bus 212 during a time period when host bus interface 301 is sampling PCI bus 212 (to determine whether internal device 320 is a target of a data transaction). The signal lpci_ibus_idle_sync_ts is a signal which indicates the target state of host bus interface 301. The signal lpci_ibus_idle_sync is generated by combiner 505 and is a signal which indicates PCI bus 212 is idle. This signal is used by internal device 320 to proceed with its transaction.

The signal force_slave_retry is the internal request signal coming from internal device 320. It is an input to the request synchronizer 501 where it is synchronized to the PCI clock domain. The signal force_slave_retry_dly is simply the force_slave_retry signal delayed by one clock cycle and is an input to enabler 502. The signal force_slave_retry sync is the force_slave_retry signal synchronized to the PCI clock domain. The signal ilforceslvtry is an output of request synchronizer 501 and forces externally originated transactions targeted at this device to retry. This signal causes the assertion of the PCI signal STOP#. The signal pci_slave_busy is an internal flag indicating to logic circuits 501–506 that PCI bus 212 is busy and that an externally originated transaction is driving data into or reading data from internal device 320.

Referring still to diagram 550, dashed line T1 shows the end of a PCI bus data transaction but not the end of a data transfer across PCI bus 212. Line T2 shows internal device 320 successfully targeted by an external PCI agent (e.g., bridge/memory controller 206) for a data transaction. The area T4 shows how accesses targeted at internal device 320 are successfully forced to retry. Dashed line T3 shows the successful acquisition of PCI bus 212. Subsequent target accesses are forced to retry.

Figure 6A:
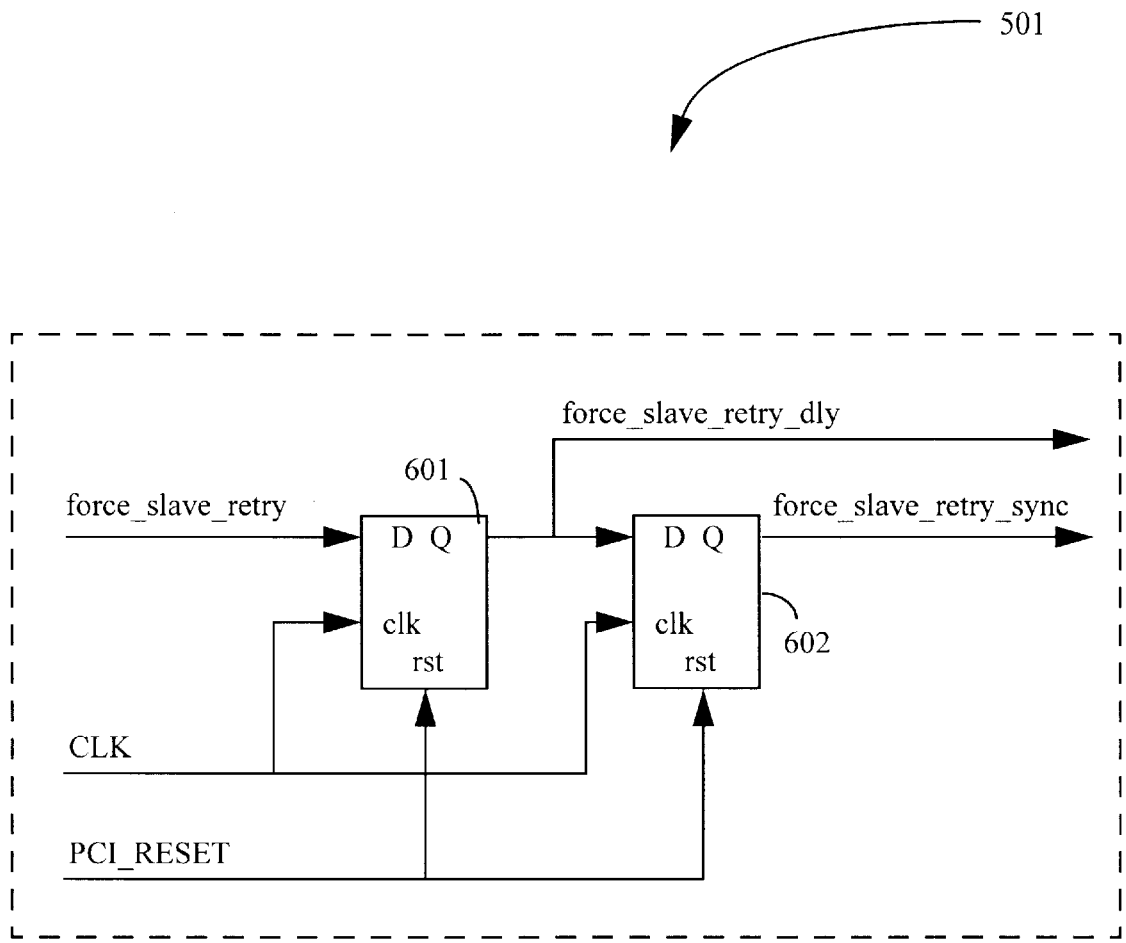
FIG. 6A shows a request synchronizer in accordance with one embodiment of the present invention.
Figure 6B:
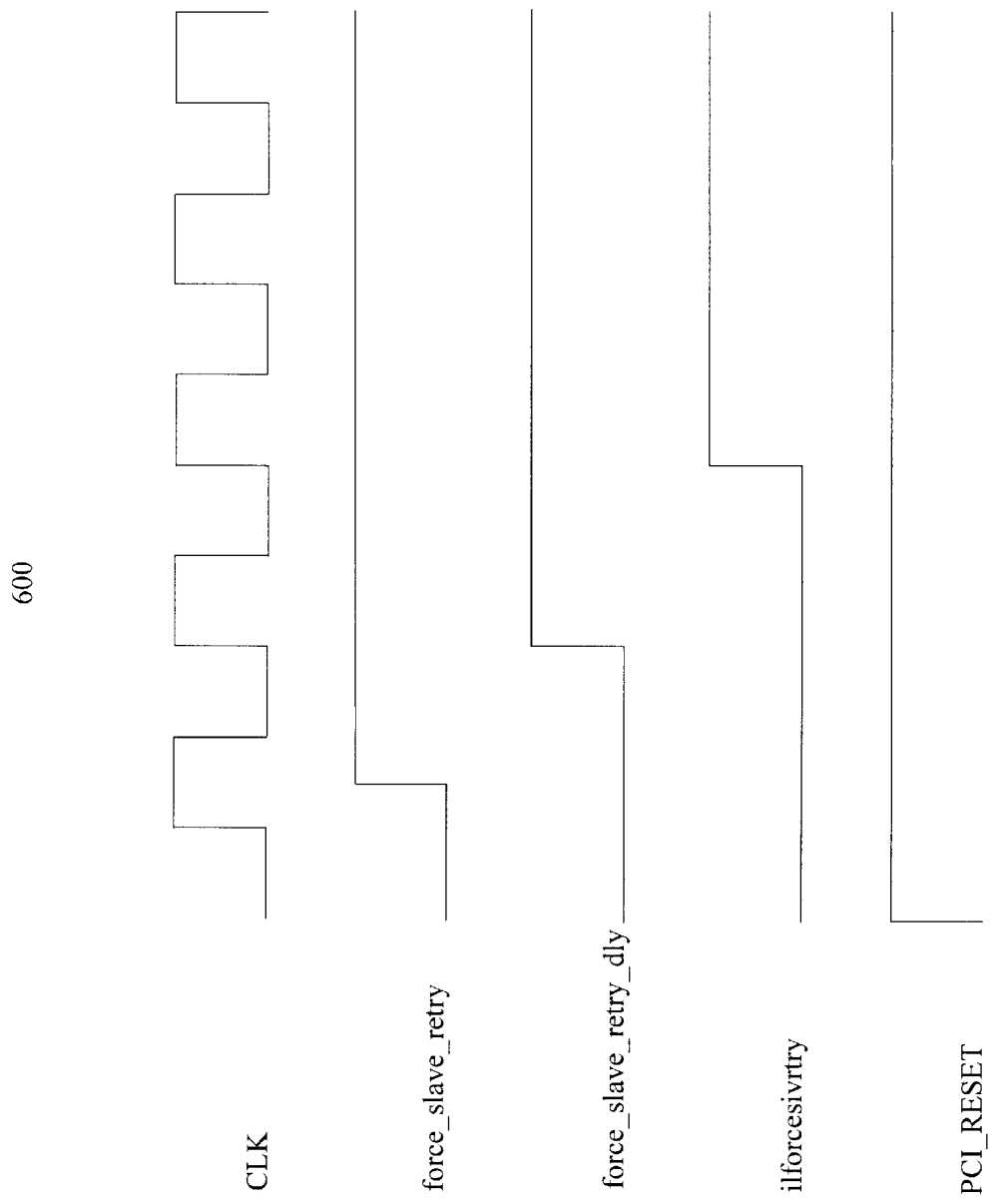
FIG. 6B shows a timing diagram illustrating the operation of the request synchronizer from FIG. 6A.

With reference now to FIG. 6A and FIG. 6B, a request synchronizer 501 in accordance with one embodiment of the present invention and a timing diagram 600 illustrating the operation of request synchronizer 501 are respectively shown. Request synchronizer 501 includes flip-flops 601 and 602. The signals force_slave_retry, CLK, and PCI_RESET are received as inputs and the signals force_slave_retry_delay and force_slave_retry_sync are generated as outputs. Timing diagram 600 shows the operation of request synchronizer 501.

Figure 7A:
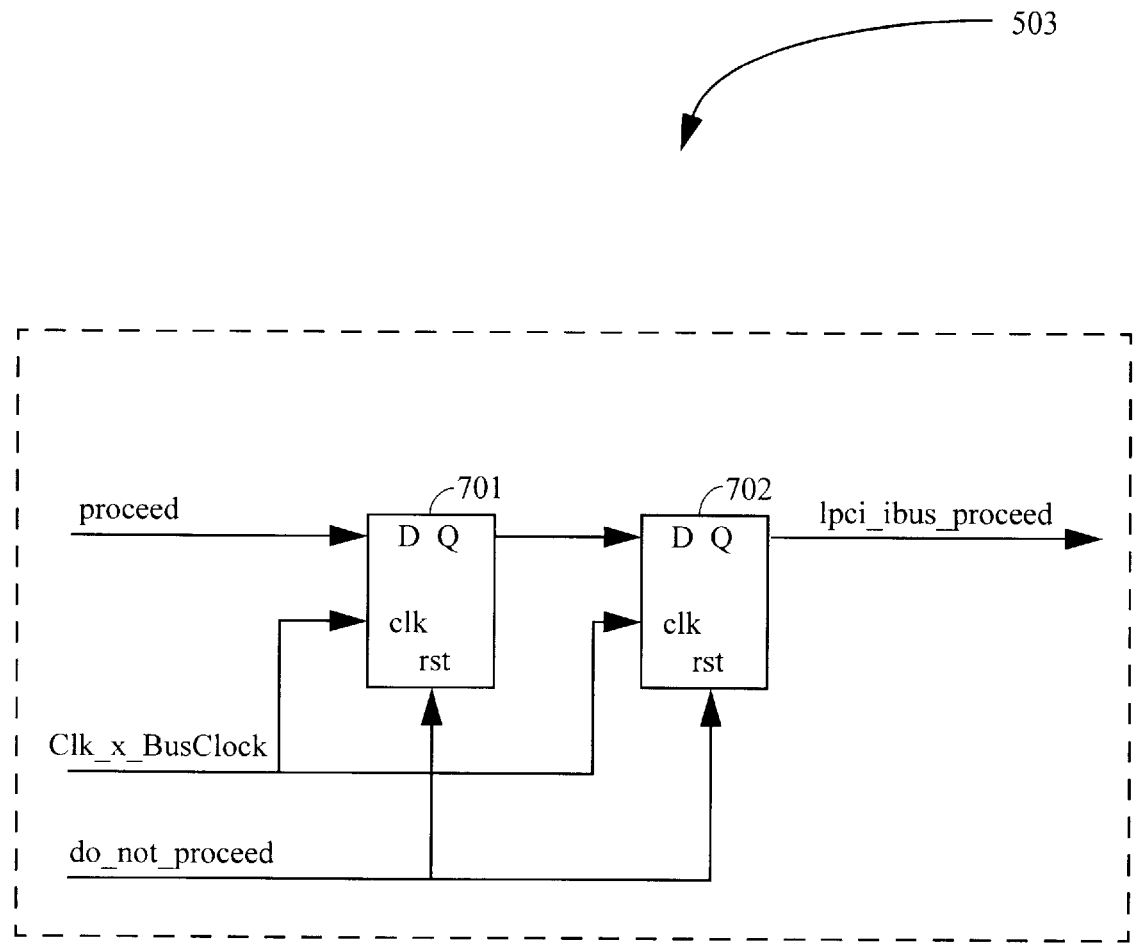
FIG. 7A shows an enabled request synchronizer in accordance with one embodiment of the present invention.
Figure 7B:
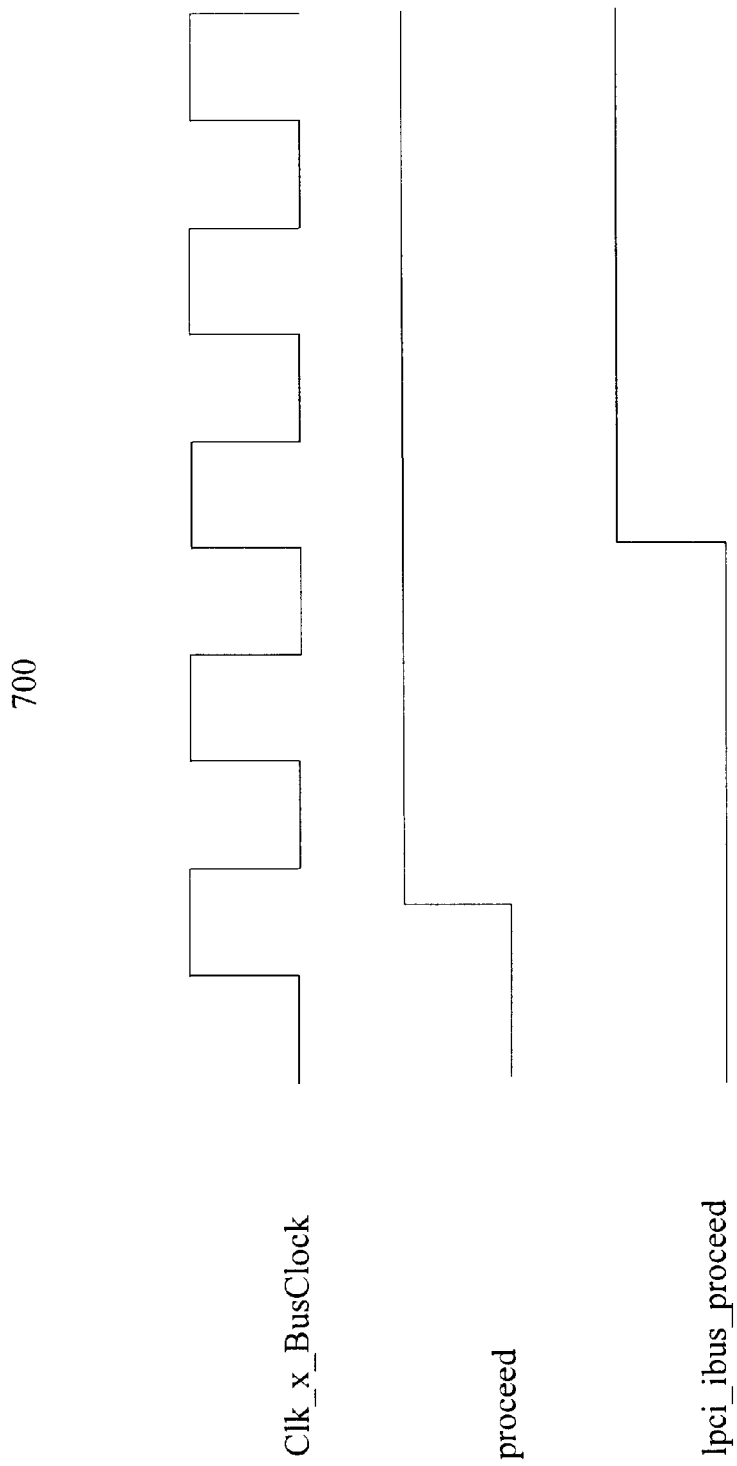
FIG. 7B shows a timing diagram illustrating the operation of the enabled request synchronizer from FIG. 7A.

Referring now to FIG. 7A and FIG. 7B, an enabled request synchronizer 503 in accordance with one embodiment of the present invention and a timing diagram 700 illustrating the operation of request synchronizer 503 are respectively shown. Enabled request synchronizer 503 includes flip-flops 701 and 702. The signals proceed, do_not_proceed, and Clk_x_BusClock are received as inputs and the signal lpci_ibus_proceed is generated as an output. Timing diagram 700 shows the operation of enabled request synchronizer 503.

Figure 8A:
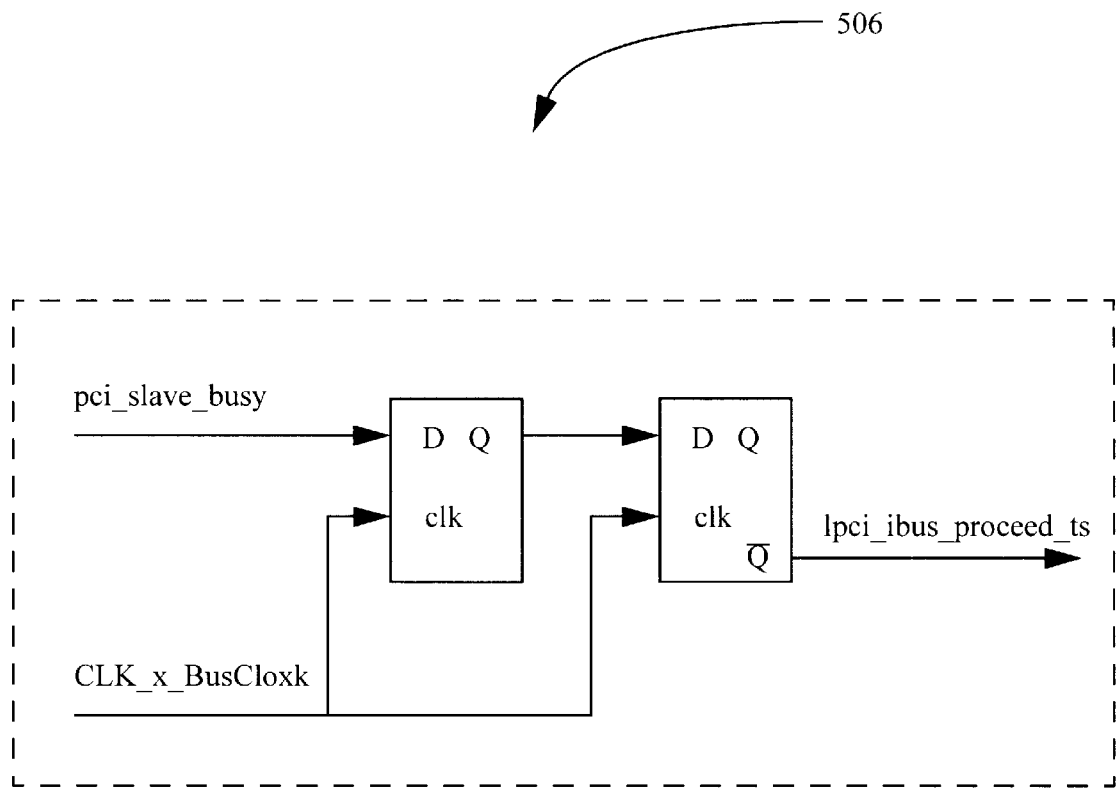
FIG. 8A shows a transaction initiation synchronizer in accordance with one embodiment of the present invention.
Figure 8B:
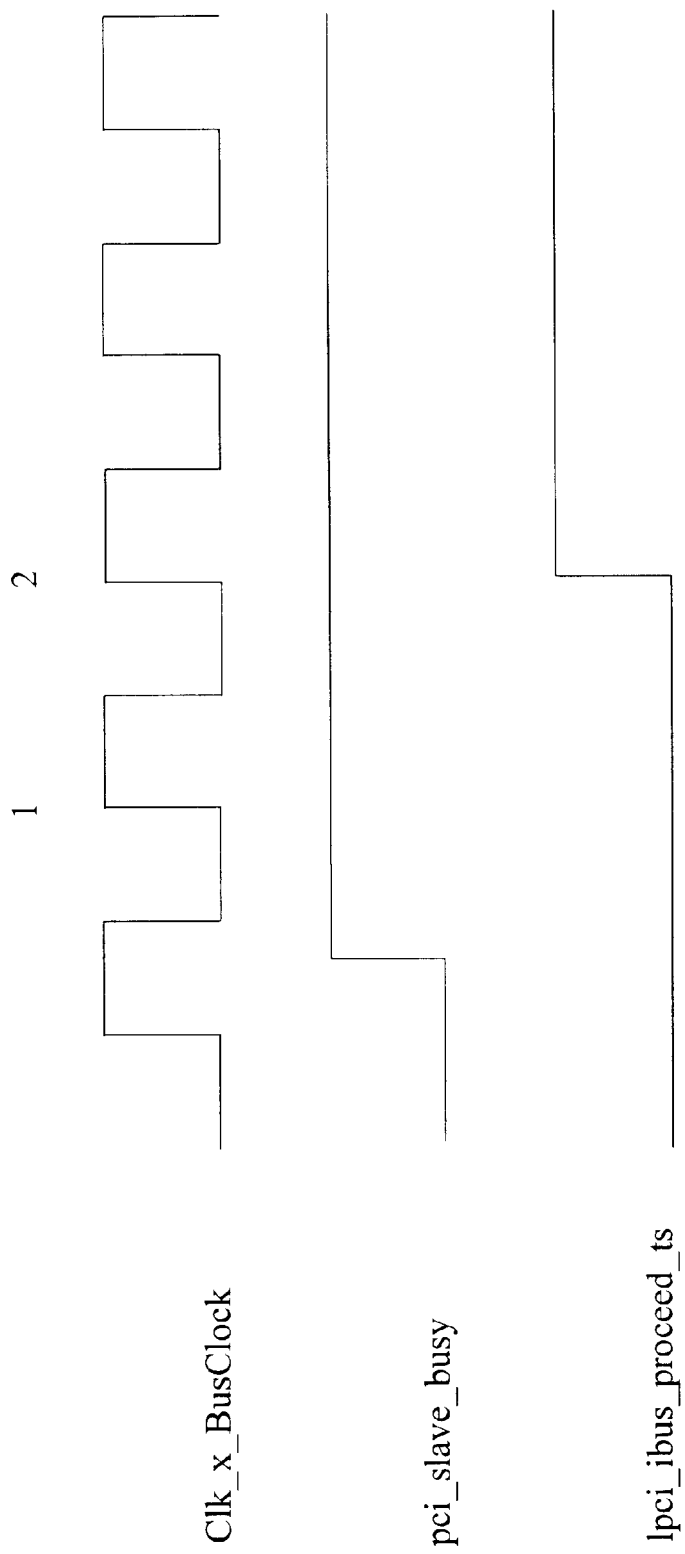
FIG. 8B shows a timing diagram illustrating the operation of the transaction initiation synchronizer from FIG. 8A.

FIG. 8A and FIG. 8B respectfully show a transaction initiation synchronizer 506 in accordance with one embodiment of the present invention and a timing diagram 800 illustrating the operation of transaction initiation synchronizer 506. The transaction initiation synchronizer 506 receives as inputs the signals pci_slave_busy and Clk_x_BusClock, and generates as an output the signal lpci_ibus_proceed_ts. The output lpci_ibus_proceed_ts is coupled to combiner 505. Timing diagram 800 shows the operation of transaction initiation synchronizer 506.

Figure 9:
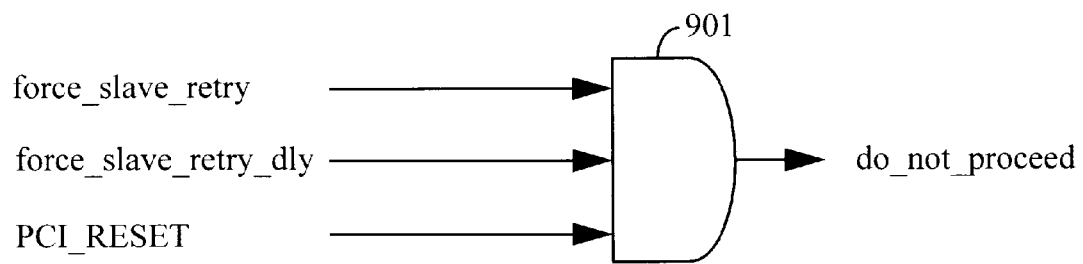
FIG. 9 shows an enabler in accordance with one embodiment of the present invention.
Figure 10:
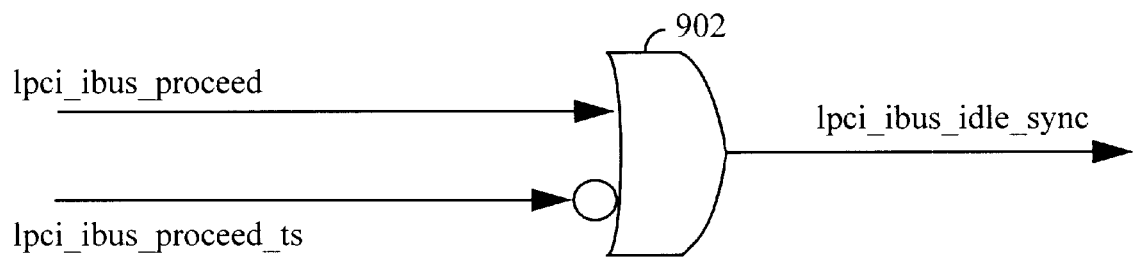
FIG. 10 shows a combiner in accordance with one embodiment of the present invention.

Referring now to FIG. 9 and FIG. 10, an enabler 502 and a combiner 505 in accordance with one embodiment of the present invention are respectively shown. Enabler 502 functions by performing a logical AND of the input signals force_slave_retry, force_slave retry_delay, and PCI_RESET using AND gate 901. The output of AND gate 901 is the signal do_not_proceed. Combiner 505 functions by performing a logical OR with the signals lpci_ibus_proceed and lpci_ibus_proceed_ts using OR gate 902. The output of OR gate 902 is the signal lpci_ibus_idle_sync.

Thus, the present invention provides a system for efficiently interfacing an agent operating in one clock domain to a PCI bus operating in another clock domain. The system of the present invention interfaces agents from differing clock domains while avoiding collisions between differing initiating agents and without causing deadlocks. The system of the present invention determines in advance whether the PCI bus may be accessed without causing a conflict. In so doing, the system of the present invention enhances the effective data transfer bandwidth of the PCI bus.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a peripheral component coupled to a peripheral component interconnect (PCI) bus, a method of interfacing an internal device within the peripheral component to the PCI bus, where the internal device operates in an internal clock domain and the PCI bus operates in a PCI clock domain, the method comprising the steps of:

a) generating a request for PCI bus ownership to the peripheral component, the request originating from the internal device operating in the internal clock domain;
 b) determining whether the PCI bus is busy;
 c) generating a proceed signal for use by the internal device when the PCI bus is idle, the proceed signal synchronous to the internal clock domain;
 d) generating a do not proceed signal for use by the internal device when the PCI bus is busy, the do not proceed signal synchronous to the internal clock domain;
 e) executing a data transaction from the internal device to the PCI bus if the internal device receives the proceed signal, the data transaction translated from the internal clock domain to a PCI clock domain;
 f) postponing the data transaction from the internal device to the PCI bus when the internal device receives the do not proceed signal; and
 g) causing a retry for an external data transaction to the internal device to prevent the external data transaction from colliding with the data transaction from the internal device when the internal device receives the proceed signal.

2. The method of claim 1 further including the step of executing the data transaction directed at the internal device when the internal device receives the do not proceed signal.

3. The method of claim 1, wherein step b) further includes the step of sampling at least one PCI signal from the PCI bus to determine whether the PCI bus is busy.

4. The method of claim 1, wherein step b) further includes the step of sampling at least one PCI signal from the PCI bus to determine whether the PCI bus is idle.

5. The method of claim 1, wherein step e) further includes acquiring the PCI bus to execute the data transaction from the internal device, the PCI bus acquired without causing a deadlock.

6. The method of claim 1, wherein step f) further includes the step of proceeding with an internal process within the internal device when the data transition is postponed such that the internal device does not remain idle waiting to execute the data transaction.

7. The method of claim 1, wherein step f) further includes indicating a collision when the internal device receives the do not proceed signal.

8. The method of claim 1, wherein step g) further includes proceeding with the external data transaction when the PCI bus is busy due to the external data transaction, the external data transaction directed at the internal device.

9. With a bus interface circuit coupled to a device, a method of interfacing the device, operating in a device clock domain, with a peripheral component interconnect (PCI) bus, operating in a PCI clock domain, the method comprising the steps of:

a) generating a request for PCI bus ownership to the bus interface circuit from the device operating in the device clock domain;
 b) determining whether the PCI bus is busy;
 c) generating a proceed signal for the device when the PCI bus is idle, the proceed signal synchronous to the device clock domain, the proceed signal originating from the bus interface circuit;
 d) generating a do not proceed signal for the device when the PCI bus is busy, the do not proceed signal synchronous to the internal clock domain, the do not proceed signal originating from the bus interface circuit;
 e) executing a data transaction from the device to the bus interface circuit when the device receives the proceed signal;
 f) translating the data transaction from the device clock domain to a PCI clock domain;
 g) sending the data transaction from the bus interface circuit on the PCI bus;
 h) postponing the data transition from the device to the bus interface circuit on the PCI bus when the device receives the do not proceed signal; and
 i) causing a retry on the PCI bus for an external data transaction to the device to prevent the external data transaction from colliding with the data transaction from the device, when the internal device receives the proceed signal.

10. The method of claim 9 further including the step of executing the data transaction directed at the device when the device receives the do not proceed signal.

11. The method of claim 9, wherein step b) further includes the step of sampling at least one PCI signal from the PCI bus to determine whether the PCI bus is busy.

12. The method of claim 9, wherein step b) further includes the step of sampling at least one PCI signal from the PCI bus to determine whether the PCI bus is idle.

13. The method of claim 9, wherein step e) further includes acquiring the PCI bus to execute the data transaction from the device, the PCI bus acquired without causing a deadlock.

14. The method of claim 9, wherein step f) further includes the step of proceeding with an internal process within the device when the data transition is postponed such that the device does not remain idle waiting to execute the data transaction.

15. The method of claim 9, wherein step f) further includes indicating a collision when the device receives the do not proceed signal.

16. The method of claim 9, wherein step g) further includes proceeding with the external data transaction when the PCI bus is busy due to the external data transaction, the external data transaction directed at the device.

17. A peripheral component coupled to a peripheral component interconnect (PCI) bus operating in a PCI clock domain, the peripheral component comprising:

an internal device, the internal device operating in an internal device clock domain; and
 a bus interface, the bus interface coupled to the PCI bus and the internal device, the bus interface adapted to operate in both the internal device clock domain and the PCI clock domain, in response to a request for PCI bus ownership received from the internal device, the bus interface generating a proceed signal when the PCI bus is idle and generating a do not proceed signal when the PCI bus is busy, wherein the internal device executing a data transaction from the internal device to the bus interface for sending on the PCI bus if the proceed signal is generated, the internal device postponing the data transaction from the internal device to the bus interface for sending on the PCI bus when the do not proceed signal is generated and causing a retry for an external data transaction to the internal device to prevent the external data transaction from conflicting with the data transaction from the device when the proceed signal is generated.

18. The peripheral component of claim 17, wherein the bus interface executing the external data transaction directed to the internal device in the PCI clock domain if the do not proceed signal is generated.

19. The peripheral component of claim 17, wherein the proceed signal and the do not proceed signals are synchronous to the internal device clock domain.

20. The peripheral component of claim 19, wherein the bus interface sampling at least one PCI signal from the PCI bus to determine whether the PCI bus is busy or idle.

21. The peripheral component of claim 20, wherein the bus interface acquiring the PCI bus to send data received from the data transaction from the internal device on the PCI bus in the PCI clock domain.

* * * * *